(12) United States Patent
Ota et al.

(10) Patent No.: US 12,138,618 B2
(45) Date of Patent: Nov. 12, 2024

(54) EXHAUST GAS PURIFICATION CATALYST

(71) Applicant: Cataler Corporation, Kakegawa (JP)

(72) Inventors: Takaya Ota, Kakegawa (JP); Shunsuke Oishi, Kakegawa (JP); Ryosuke Takasu, Kakewaga (JP)

(73) Assignee: Cataler Corporation, Kakegawa (JP)

( * ) Notice: Subject to any disclaimer, the term of this patent is extended or adjusted under 35 U.S.C. 154(b) by 413 days.

(21) Appl. No.: 17/638,909

(22) PCT Filed: Jul. 30, 2020

(86) PCT No.: PCT/JP2020/029202
§ 371 (c)(1),
(2) Date: Feb. 28, 2022

(87) PCT Pub. No.: WO2021/044768
PCT Pub. Date: Mar. 11, 2021

(65) Prior Publication Data
US 2022/0297094 A1   Sep. 22, 2022

(30) Foreign Application Priority Data

Sep. 2, 2019   (JP) ................... 2019-159780

(51) Int. Cl.
  *B01J 21/04*   (2006.01)
  *B01D 53/94*   (2006.01)
  (Continued)

(52) U.S. Cl.
  CPC ........ *B01J 23/464* (2013.01); *B01D 53/9413* (2013.01); *B01D 53/9468* (2013.01);
  (Continued)

(58) Field of Classification Search
  CPC ... B01J 21/04; B01J 23/02; B01J 23/10; B01J 23/44; B01J 23/464; B01J 35/19;
  (Continued)

(56) References Cited

U.S. PATENT DOCUMENTS 7,758,834 B2 *   7/2010   Chen ................... F01N 13/0097
                                                                60/299
7,875,250 B2 *   1/2011   Nunan ................. B01J 37/0248
                                                                422/177

(Continued)

FOREIGN PATENT DOCUMENTS

CN    102395428 A    3/2012
CN    107249737 A    10/2017
(Continued)

OTHER PUBLICATIONS

Office Action issued in Chinese Application No. 202080062866.9 dated Mar. 9, 2024.
(Continued)

*Primary Examiner* — Cam N. Nguyen
(74) *Attorney, Agent, or Firm* — Occhiuti & Rohlicek LLP

(57) ABSTRACT

The present invention provides an exhaust gas purification catalyst including a base material 11 and a catalyst layer 20 provided on the base material 11. The catalyst layer 20 includes: a catalyst metal; and a carrying material 21 carrying the catalyst metal. The carrying material 21 includes: an OSC material 22 having an oxygen storage capacity; and a carrier 23 other than the OSC material. The OSC material 22 has a mean particle diameter Dx of 1.5 μm or more which is larger than the mean particle diameter Dy of the carrier 23 other than the OSC material 22.

17 Claims, 4 Drawing Sheets

(51) Int. Cl.
  *B01J 23/02* (2006.01)
  *B01J 23/10* (2006.01)
  *B01J 23/44* (2006.01)
  *B01J 23/46* (2006.01)
  *B01J 35/00* (2006.01)
  *B01J 35/10* (2006.01)
  *B01J 35/50* (2024.01)
  *F01N 3/28* (2006.01)

(52) U.S. Cl.
  CPC .......... *B01D 53/9472* (2013.01); *B01J 23/02* (2013.01); *B01J 23/10* (2013.01); *B01J 35/19* (2024.01); *B01J 35/50* (2024.01); *F01N 3/2803* (2013.01); *B01D 2255/1023* (2013.01); *B01D 2255/1025* (2013.01); *B01D 2255/2063* (2013.01); *B01D 2255/2092* (2013.01); *B01D 2255/407* (2013.01); *B01D 2255/908* (2013.01); *B01D 2255/9202* (2013.01); *F01N 2370/02* (2013.01)

(58) Field of Classification Search
  CPC .... B01J 35/50; F01N 3/2803; B01D 53/9413; B01D 53/9468; B01D 53/9472
  USPC .. 502/304, 332–334, 339, 355, 415, 527.12, 502/527.13
  See application file for complete search history.

(56) References Cited

U.S. PATENT DOCUMENTS

| | | | | |
|---|---|---|---|---|
| 8,007,750 B2* | 8/2011 | Chen | ................... | B01D 53/945 502/262 |
| 8,323,599 B2* | 12/2012 | Nunan | ................... | B01J 23/42 60/299 |
| 8,394,348 B1* | 3/2013 | Nunan | ................... | B01J 35/615 60/299 |
| 8,501,661 B2* | 8/2013 | Sunada | ................... | B01J 35/30 502/333 |
| 8,530,372 B2* | 9/2013 | Luo | ................... | B01J 37/0244 502/343 |
| 8,546,296 B2* | 10/2013 | Yabuzaki | ................... | B01J 37/0248 428/116 |
| 8,580,705 B2* | 11/2013 | Aoki | ................... | B01J 37/0248 502/304 |
| 8,853,120 B2* | 10/2014 | Aoki | ................... | B01D 53/945 502/527.12 |
| 8,950,174 B2* | 2/2015 | Hilgendorff | ................... | B01D 53/945 60/299 |
| 8,968,690 B2* | 3/2015 | Nunan | ................... | B01J 23/42 422/177 |
| 9,387,461 B2* | 7/2016 | Wu | ................... | B01J 37/031 |
| 9,440,223 B2* | 9/2016 | Aoki | ................... | B01J 23/002 |
| 9,550,176 B2* | 1/2017 | Sato | ................... | B01J 37/0246 |
| 9,597,660 B2* | 3/2017 | Aoki | ................... | B01J 35/19 |
| 9,675,970 B2* | 6/2017 | Matsueda | ................... | B01J 23/63 |
| 9,694,348 B2* | 7/2017 | Hoshino | ................... | B01J 35/393 |
| 9,839,902 B2* | 12/2017 | Suzuki | ................... | B01J 23/63 |
| 10,010,873 B2* | 7/2018 | Aoki | ................... | F01N 3/2828 |
| 10,307,736 B2* | 6/2019 | Saito | ................... | F01N 3/0814 |
| 10,413,885 B2* | 9/2019 | Suzuki | ................... | B01J 35/56 |
| 10,576,420 B2* | 3/2020 | Chinzei | ................... | B01J 35/30 |
| 10,576,458 B2* | 3/2020 | Imada | ................... | B01D 53/945 |
| 10,618,034 B2* | 4/2020 | Kasuya | ................... | F01N 3/101 |
| 10,625,243 B2* | 4/2020 | Clowes | ................... | B01J 23/464 |
| 10,688,476 B2* | 6/2020 | Onoe | ................... | B01J 21/04 |
| 10,850,269 B2* | 12/2020 | Tanaka | ................... | B01J 35/19 |
| 11,110,435 B2* | 9/2021 | Onoe | ................... | B01J 37/0248 |
| 11,203,958 B2* | 12/2021 | Clowes | ................... | B01J 23/464 |
| 11,248,505 B2* | 2/2022 | Sung | ................... | B01J 23/02 |
| 11,260,372 B2* | 3/2022 | Xue | ................... | B01D 53/9472 |
| 11,286,830 B2* | 3/2022 | Saito | ................... | B01D 53/945 |
| 11,420,189 B2* | 8/2022 | Sawada | ................... | B01D 53/94 |
| 11,577,234 B2* | 2/2023 | Dong | ................... | B01J 37/0244 |
| 11,904,299 B2* | 2/2024 | Zheng | ................... | B01D 53/9468 |
| 2009/0175773 A1* | 7/2009 | Chen | ................... | B01J 20/3021 422/177 |
| 2009/0240643 A1* | 9/2009 | Bridgewater | ................... | G06Q 10/06 706/45 |
| 2012/0094827 A1* | 4/2012 | Matsueda | ................... | B01J 37/0221 502/300 |
| 2012/0149557 A1 | 6/2012 | Hoshino et al. | | |
| 2015/0111727 A1 | 4/2015 | Nagashima | | |
| 2015/0273462 A1 | 10/2015 | Iwakura et al. | | |
| 2016/0288096 A1* | 10/2016 | Fujiwara | ................... | B01J 37/0244 |
| 2017/0189892 A1* | 7/2017 | Yin | ................... | B01J 35/23 |
| 2017/0296968 A1* | 10/2017 | Yoshida | ................... | B01D 53/9472 |
| 2018/0021726 A1 | 1/2018 | Onoe et al. | | |
| 2018/0071679 A1* | 3/2018 | Karpov | ................... | F01N 3/20 |
| 2019/0083932 A1 | 3/2019 | Onozuka et al. | | |
| 2019/0193057 A1 | 6/2019 | Hoshino et al. | | |
| 2020/0276567 A1* | 9/2020 | Onoe | ................... | B01J 35/19 |
| 2020/0316579 A1 | 10/2020 | Takesue et al. | | |
| 2022/0055021 A1* | 2/2022 | Liu | ................... | B01J 37/04 |
| 2022/0154621 A1* | 5/2022 | Noguchi | ................... | B01J 37/0228 |
| 2022/0176354 A1* | 6/2022 | Noguchi | ................... | F01N 3/20 |
| 2022/0191236 A1* | 6/2022 | Henderson | ................... | G06F 40/177 |
| 2022/0193639 A1* | 6/2022 | Vjunov | ................... | B01J 23/02 |
| 2022/0203339 A1* | 6/2022 | Zheng | ................... | B01J 21/04 |
| 2023/0277986 A1* | 9/2023 | Miura | ................... | B01J 37/0242 502/103 |
| 2023/0302438 A1* | 9/2023 | Onoe | ................... | B01J 21/04 |
| 2024/0139716 A1* | 5/2024 | Nishio | ................... | F01N 3/0814 |
| 2024/0165591 A1* | 5/2024 | Noguchi | ................... | B01J 23/63 |

FOREIGN PATENT DOCUMENTS

| | | |
|---|---|---|
| CN | 108778491 A | 11/2018 |
| CN | 109153014 A | 1/2019 |
| CN | 109789388 A | 5/2019 |
| EP | 1900427 A1 | 3/2008 |
| EP | 2431092 A1 | 3/2012 |
| EP | 2797678 A1 | 11/2014 |
| JP | H0699069 A | 4/1994 |
| JP | H09253454 A | 9/1997 |
| JP | 2014200714 A | 10/2014 |
| JP | 2015037613 A | 2/2015 |
| JP | 5931214 B | 6/2016 |
| JP | 6150845 B | 6/2017 |
| JP | 2017189735 A | 10/2017 |
| JP | 2019136695 A | 8/2019 |
| WO | 2009009013 A2 | 1/2009 |
| WO | 2010119904 A1 | 10/2010 |
| WO | 2014002667 A1 | 1/2014 |
| WO | 2014156746 A1 | 10/2014 |
| WO | 2017204008 A1 | 11/2017 |

OTHER PUBLICATIONS

International Search Report, PCT Application No. PCT/JP2020/029202, mailed Oct. 6, 2020 (3 Pages).
English Translation of the Written Opinion in PCT/JP2020/029202, published Mar. 17, 2022 (9 pages).
Extended European Search Report in EP20861642.5, published Aug. 11, 2022 (13 pages).
Office Action issued in Japanese Patent Application No. 2019-159780 dated Jul. 6, 2023.

* cited by examiner

EXHAUST GAS PURIFICATION CATALYST

CROSS REFERENCE TO RELATED APPLICATIONS

This application is a U.S. national stage application of International Application no. PCT/JP2020/029202, filed Jul. 30, 2020, which claims the benefit of the filing date of Japanese Application No. JP2019-159780, filed Sep. 2, 2019, the contents of which are hereby incorporated by reference in their entirety.

TECHNICAL FIELD

The present invention relates to an exhaust gas purification catalyst.

The present application is based upon and claims the benefit of priority from Japanese patent application No. 2019-159780 filed on Sep. 2, 2019, and the entire disclosure of which is incorporated herein its entirety by reference.

BACKGROUND ART

The exhaust gas exhausted from the internal combustion engine such as an automobile engine contains hazardous components such as hydrocarbon (HC), carbon monoxide (CO), and nitrogen oxide (NOx). In order to efficiently capture/remove these hazardous components from the exhaust gas, an exhaust gas purification catalyst has been conventionally used. Prior art documents related to the exhaust gas purification catalyst include, for example, Patent Literatures 1 to 3.

Patent Literature 1 discloses an exhaust gas purification catalyst including a catalyst layer that includes at least two kinds of carriers with different particle sizes and a noble metal, to enhance gas diffusivity and gas miscibility in the catalyst layer. Patent Literature 1 describes using particles including silica or alumina, as a carrier with a large particle diameter, and using an oxygen storage material (OSC material) including ceria or zirconia and having an oxygen storage capacity (OSC), as a carrier with a small particle diameter.

CITATION LIST

Patent Literatures

Patent Literature 1: WO 2015/037613
Patent Literature 2: Japanese Patent Application Publication No. H09-253454
Patent Literature 3: Japanese Patent Application Publication No. 2017-189735

SUMMARY OF INVENTION

The OSC material stores oxygen present in exhaust gas when the exhaust gas has a lean air-to-fuel ratio (i.e., in an oxygen-rich atmosphere compared to a theoretical air-to-fuel ratio, and releases the stored oxygen when the exhaust gas has a rich air-to-fuel ratio (i.e., in an oxygen-poor atmosphere compared to a theoretical air-to-fuel ratio). That is, the OSC material acts to mitigate atmospheric variations. Accordingly, for example, even if the air-to-fuel ratio of the exhaust gas varies due to traveling conditions of automobiles, a stable catalytic capacity can be achieved. The OSC material can be, for example, a $CeO_2$—$ZrO_2$ composite oxide.

Recently, in order to secure purification of exhaust gas with a small amount of noble metals, the exhaust gas purification catalyst has been desired to improve its heat resistance. However, the exhaust gas purification performance of conventional exhaust gas purification catalysts is degraded with repeated use, which has been a problem. The present inventors have conducted earnest studies and have considered that one of major causes of this degradation is the low heat resistance of the OSC material. Specifically, when the exhaust gas purification catalyst is exposed to high-temperature exhaust gas for a long period of time, the OSC material becomes coarse due to sintering, and the specific surface area of the OSC material decreases. The decrease in the specific surface area of the OSC material causes a decrease in the number of active sites at which oxygen is exchanged with the outside air, and a decrease in the rate of the exchange. Further, with the sintering, the number of structural defects decreases (e.g., the phase of the $CeO_2$—$ZrO_2$ composite oxide as the OSC material is separated), and the amount of OSC material decreases. In addition, if the oxygen inflow exceeds the storage capacity of the exhaust gas purification catalyst, the OSC performance decreases. Due to the decrease, the ternary activity cannot maintain its highest stoichiometric state. As a result, the exhaust gas is in the oxygen-rich atmosphere, and the exhaust gas purification performance, especially the NOx purification performance greatly decreases. In addition, the sintering of noble metals occurs with the degradation of the carrier, and the catalytic activity decreases with the decrease in the surface area of the noble metals. The sintering of noble metals progresses by a change in the redox state of the noble metals themselves. It is thus important to enhance the heat resistance of the carrier, especially the heat resistance of the OSC material.

The present invention was made in view of the circumstances described above, and is intended to provide an exhaust gas purification catalyst with higher heat resistance of the OSC material and improved durability.

The present invention provides an exhaust gas purification catalyst including a base material; and a catalyst layer provided on the base material. The catalyst layer includes: a catalyst metal; and a carrying material carrying the catalyst metal. The carrying material includes: an OSC material having an oxygen storage capacity; and a carrier other than the OSC material. The OSC material has a mean particle diameter Dx in volume base based on electron microscopy of 1.5 μm or more which is larger than a mean particle diameter Dy in volume base based on electron microscopy of the carrier other than the OSC material (Dy<Dx).

The difference in particle diameter between the OSC material and the carrier other than the OSC material can increase the "particle surface (interface)" at which a reaction is prone to occur. Here, particles indicate particles of all the catalyst metal, the OSC material, and non-OSC material forming the catalyst layer. The increase in the interface within the catalyst layer can improve the degree of contact between the catalyst layer and exhaust gas. Further, according to the study conducted by the present inventors, the particle diameter of the OSC material highly correlates with the heat resistance. Specifically, the larger the particle diameter of the OSC material is, the higher the heat resistance tends to be. Setting the particle diameter of the OSC material to be larger than the particle diameter of the carrier other than the OSC material thus increases the heat resistance of the OSC material. With this configuration, the OSC material can thus stably exhibits an oxygen storage capacity even after repeated use. As a result, the exhaust gas purification catalyst is less prone to reduce its catalytic capacity and has high durability.

In a preferred aspect of the present invention, a ratio (Dx/Dy) of the mean particle diameter Dx of the OSC material to the mean particle diameter Dy of the carrier other than the OSC material is 1.3 or more to 20 or less. This can improve gas diffusivity within the catalyst layer and the degree of contact between the exhaust gas and the OSC material.

In another aspect of the present invention, a content ratio of the carrier other than the OSC material relative to 100 parts by mass of the OSC material is 25 parts by mass to 200 parts by mass. This can exhibit the above-described advantage more suitably.

In a preferred aspect of the present invention, the carrier other than the OSC material has the mean particle diameter Dy of 3 µm or less. This can improve durability and the heat resistance of the catalyst layer suitably.

In a preferred aspect of the present invention, the OSC material has the mean particle diameter Dx of 15 µm or less. This can ensure a wider contact area between the exhaust gas and the catalyst layer (e.g., the OSC material), and can improve exhaust gas purification performance suitably.

In a preferred aspect of the present invention, the OSC material is a Ce-containing oxide including ceria. The OSC material including ceria allows suitable enhancement of the oxygen storage capacity.

In a preferred aspect of the present invention, the carrier other than the OSC material is an Al-containing oxide including alumina. The carrier other than the OSC material, including alumina allows suitable enhancement of the heat resistance of the catalyst layer.

In a preferred aspect of the present invention, the catalyst layer is formed on the surface of the base material, and a second catalyst layer including a catalyst metal is formed on the catalyst layer, the catalyst metal being different in kind from the catalyst metal of the catalyst layer. This can further improve the exhaust gas purification performance.

In a preferred aspect of the present invention, the catalyst layer includes Pd and the catalyst layer, and the second catalyst layer includes Rh as the catalyst metal. This can further improve the exhaust gas purification performance.

In a preferred aspect of the present invention, in an exhaust gas flow direction from an inlet from which the exhaust gas flows in toward an outlet from which the exhaust gas flows out, the catalyst layer has different compositions on an upstream side and a downstream side. This allows the exhaust gas purification catalyst to have both the oxygen storage capacity and the heat resistance at high level.

In a preferred aspect of the present invention, when the catalyst layer is divided into the exhaust gas flow direction into an early-stage portion near the inlet and a later-stage portion near the outlet, the early-stage portion includes a higher amount of the carrier other than the OSC material than the later-stage portion. This allows the durability (especially the heat resistance) of the catalyst layer to be improved, and allows the exhaust gas purification catalyst to have both the oxygen storage capacity and the heat resistance at high level for a long period of time.

DESCRIPTION OF EMBODIMENTS

First Embodiment

Figure 1:
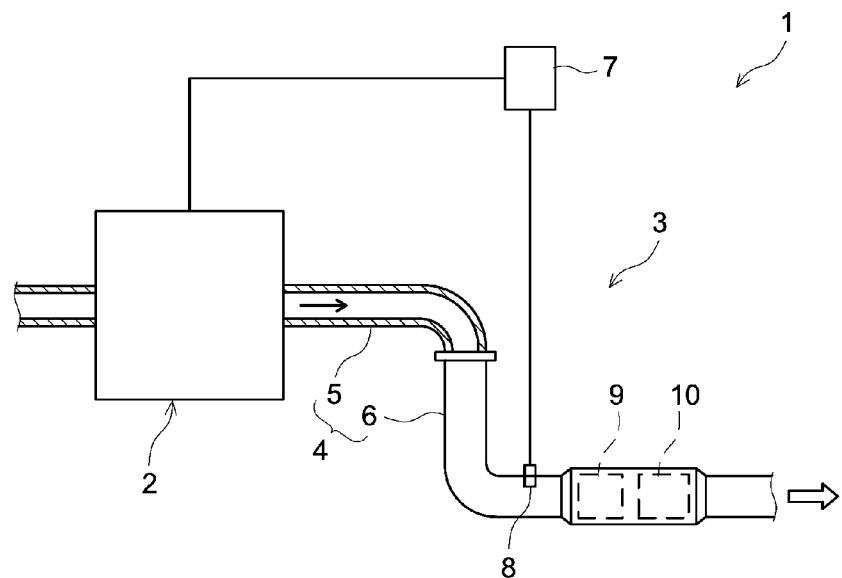
FIG. 1 is a schematic view of an exhaust gas purification system according to a first embodiment.

Some preferred embodiments of the present invention will be described below with reference to the accompanying drawings. The matters necessary for executing the present invention, except for matters specifically herein referred to can be grasped as design matters of those skilled in the art based on the related art in the preset field. The present invention can be executed based on the contents disclosed herein and the technical knowledge in the present field. In the following drawings, the same members/portions which exhibit the same action are denoted by the same reference numerals, and the duplicated descriptions may be omitted or simplified. The dimensional relation (such as length, width, or thickness) in each drawing does not reflect the actual dimensional relation. The expression "A to B" (A and B are any numerical values) indicating herein a range means A or more to B or less, and also encompasses the meaning of "preferably more than A" and "preferably less than B."

FIG. 1 is a schematic view of an exhaust gas purification system 1. The exhaust gas purification system 1 includes: an internal combustion engine 2 and an exhaust gas purification device 3. The exhaust gas purification system 1 purifies, by using an exhaust gas purification device 3, hazardous components such as HC, CO, and NOx contained in exhaust gas exhausted from the internal combustion engine 2. The arrow in FIG. 1 represents an exhaust gas flow direction. Further, in the following description, along the flow of the exhaust gas, the side near the internal combustion engine 2 is referred to as an upstream side, and the side farther from the internal combustion engine 2 is referred to as a downstream side.

To the internal combustion engine 2, an air-fuel mixture including oxygen and fuel gas is supplied. The internal combustion engine 2 combusts this air-fuel mixture and converts the combustion energy into mechanical energy. The combusted air-fuel mixture is exhausted into the exhaust gas purification device 3 as an exhaust gas. In the present embodiment, the internal combustion engine 2 is configured mainly of a gasoline engine of a gasoline-powered vehicle. Note that the internal combustion engine 2 may be an engine other than the gasoline engine. The internal combustion engine 2 may be, for example, a diesel engine or an engine in a hybrid vehicle.

The exhaust gas purification device 3 includes an exhaust path 4, an engine control unit (ECU) 7, a sensor 8, a first catalyst 9, and a second catalyst 10. The exhaust gas flows through the exhaust path 4. The exhaust path 4 of the present embodiment includes an exhaust manifold 5 and an exhaust pipe 6. One end (an end on the upstream side) of the exhaust manifold 5 is connected to an exhaust port (not shown) of the internal combustion engine 2. The other end (an end on the downstream side) of the exhaust manifold 5 is connected to the exhaust pipe 6. In the middle of the exhaust pipe 6, the first catalyst 9 and the second catalyst 10 are placed in order from the upstream side. Note that the placement of the first catalyst 9 and the second catalyst 10 can be changed, as appropriate. The number of the first catalysts 9 and the second catalysts 10 is not particularly limited, and may be multiple. A third catalyst may further be placed on the downstream side of the second catalyst 10.

The configuration of the first catalyst 9 may be the same as conventional one and is not particularly limited. The first catalyst 9 can be, for example, a conventionally known oxidation catalyst (ODC), a three-way catalyst, a HC selective reduction NOx catalyst, a NOx storage reduction catalyst (LNT), or a urea selective reduction NOx catalyst. The first catalyst 9 may have a function to increase the temperature of the exhaust gas flowing into the second catalyst 10, for example. The first catalyst 9 is not a necessary component and may not be used. The second catalyst 10 is an example of the exhaust gas purification catalyst disclosed herein. The configuration of the second catalyst 10 will be described in detail later.

The ECU 7 controls the internal combustion engine 2 and the exhaust gas purification device 3. The ECU 7 is electrically connected to a sensor (e.g., an oxygen sensor, a temperature sensor, and a pressure sensor) 8 installed in each of parts of the internal combustion engine 2 and the exhaust gas purification device 3. The ECU 7 receives information sensed with the sensor 8 as an electrical signal via an input port (not shown). The ECU 7 receives information on the operating state of the gasoline-powered vehicle and the amount, temperature, and pressure of the exhaust gas exhausted from the internal combustion engine 2, for example. The ECU 7 transmits a control signal via an output port (not shown) in accordance with information received, for example. The ECU 7 performs an operation control such as a fuel injection control and a fuel ignition control of the internal combustion engine 2, and an intake air volume control. The ECU 7 controls driving and stopping of the exhaust gas purification device 3 according to the operating state of the internal combustion engine 2, the amount of exhaust gas exhausted from the internal combustion engine 2, and the like. The configuration of the ECU 7 may be the same as conventional one and is not particularly limited. The ECU 7 may be, for example, a processor or an integrated circuit.

Figure 2:
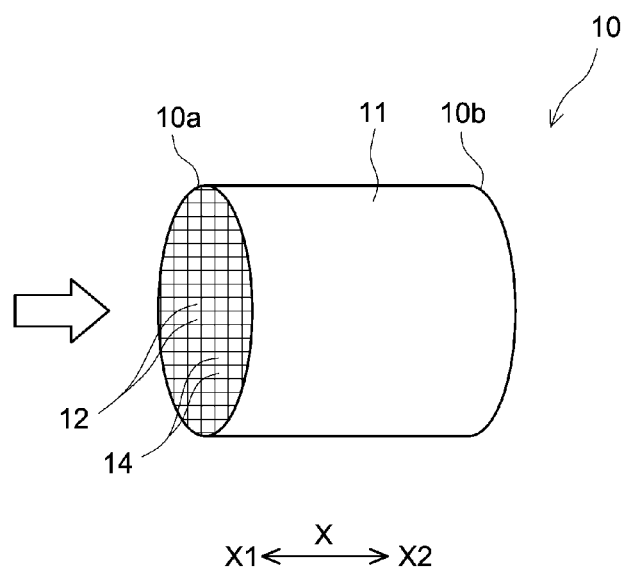
FIG. 2 is a schematic perspective view of an exhaust gas purification catalyst according to the first embodiment.

FIG. 2 is a perspective view of the second catalyst (exhaust gas purification catalyst) 10. In FIG. 2, the left side is the upstream side (front side) of the exhaust path 4, and the right side is the downstream side (rear side) of the exhaust path 4. The reference sign X represents the cylinder axis direction of the cylinder axis of the exhaust gas purification catalyst 10, in other words, the exhaust gas flow direction. The exhaust gas purification catalyst 10 is placed in the exhaust path 4 such that the cylinder axis direction X follows the exhaust gas flow direction. Hereinafter, in the cylinder axis direction X, a side toward one direction X1 may be referred to as the upstream side (the exhaust gas inflow side, the front side), and a side toward the other direction X2 may be referred to as the downstream side (the exhaust gas outflow side, the rear side).

Figure 3:
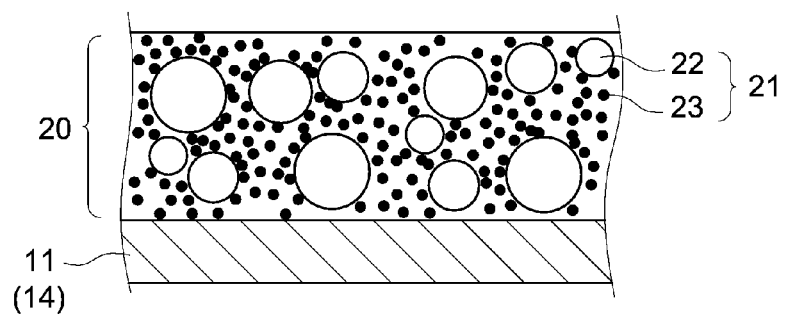
FIG. 3 is a partially schematic cross-sectional view of a configuration of a catalyst layer according to the first embodiment.

The exhaust gas purification catalyst 10 includes a base material 11 having a straight flow structure, and a catalyst layer 20 (see FIG. 3). In the present embodiment, the base material 11 has a honeycomb structure. The base material 11 includes a plurality of cells (hollows) 12 regularly arranged in the cylinder axis direction X, and partitions (ribs) 14 partitioning the cells 12. The end of the exhaust gas purification catalyst 10 in one direction X1 is the inlet 10a for the exhaust gas, and the end of the same in the other direction X2 is the outlet 10b for the exhaust gas.

The base material 11 forms the framework of the exhaust gas purification catalyst 10. The base material 11 is not particularly limited, and can adopt various materials and forms conventionally for use in this kind of use. The base material 11 can be, for example, made of preferably a material having a high heat resistance, such as ceramics such as cordierite, aluminum titanate, and silicon carbide, and an alloy such as stainless steel. In the present embodiment, the outside shape of the base material 11 is cylindrical. The outside shape of the base material 11 is not particularly limited, and examples thereof include an elliptic cylindrical shape, a polygonal cylindrical shape, a foam form, a pellet shape, a fiber form. The volume of the base material 11 (the apparent volume including the volume of the cells 12) may be approximately 0.1 L to 5 L, for example, about 0.5 L to about 2 L. Although not particularly limited thereto, the length (overall length) of the base material 11 along the cylinder axis direction X may be approximately 20 mm to 500 mm, for example, about 50 mm to about 200 mm.

The cells 12 each form an exhaust gas passage. The cells 12 each extend in the cylinder axis direction X. The cells 12 are each a through hole passing through the base material 11 in the cylinder axis direction X. The shape, size, number, and the like of the cells 12 can be designed in consideration of the flow rate and components of the exhaust gas supplied to the exhaust gas purification catalyst 10, for example. The cross sectional shape of the cells 12 orthogonal to the cylinder axis direction X is not particularly limited. The cross sectional shape of the cells 12 may be, for example, any of various geometric shapes, namely a quadrilateral such as square, parallelogram, rectangle, trapezoid; other polygons (e.g., triangle, hexagonal, octagonal); and circular. The base material 11 includes partitions 14 partitioning the cells 12. The partitions 14 face the cells 12 and each partition adjacent cells 12. Although not particularly limited thereto, the thickness of each partition 14 (the dimension of each partition 14 in the direction orthogonal to its surface, hereinafter the same) may be approximately 0.1 mill to 30 mill (1 mill=about 25.4 μm), for example, about 1 mill to about 10 mill, to reduce a pressure drop.

FIG. 3 is a cross-sectional view of an enlarged portion of the exhaust gas purification catalyst 10 cut along the cylinder axis direction X. In the present embodiment, the catalyst layer 20 is provided on the surface of the base material 11 (specifically on the partitions 14). The catalyst layer 20 is typically a porous body having many voids communicating with one another. The catalyst layer 20 is a place where exhaust gas is purified. The exhaust gas flowing into the exhaust gas purification catalyst 10 comes into contact with the catalyst layer 20 while flowing through the passages (cells 12) in the exhaust gas purification catalyst 10. In this manner, hazardous components in the exhaust gas are purified. For example, HC and Co contained in the exhaust gas are oxidized by the catalytic function of the catalyst layer 20, thereby converted (purified) into water, carbon dioxide, and the like. Further, for example, NOx is reduced by the catalytic function of the catalyst layer 20, thereby converted (purified) into nitrogen.

The catalyst layer 20 includes a catalyst metal (not shown) and a carrying material 21 carrying the catalyst metal. The catalyst metal is carried on the surface of the carrying material 21. As the catalyst metal, various metal species that can function as an oxidation catalyst or a reduction catalyst for purification of hazardous components can be used. Typical examples of the catalyst metal include platinum group metals, namely rhodium (Rh), palladium (Pd), platinum (Pt), ruthenium (Ru), osmium (Os), and iridium (Ir). In place of or in addition to the platinum group metals, other metal species such as alkali metals, alkaline earth metals, and transition metals may be used. For example, metal species such as iron (Fe), cobalt (Co), nickel (Ni), copper (Cu), silver (Ag), and gold (Au) may also be used. Alloys of two or more kinds of these metals may also be used. Among them, an oxidation catalyst (e.g., at least one of Pd or Pt) having high oxidation activity and a reduction catalyst (e.g., Rh) having high reduction activity are suitable, and a combination of two or more kinds of them is particularly preferable. The oxidation catalyst and the reduction catalyst may be present in the same (single) catalyst layer.

The catalyst metal used is preferably in a form of fine particles having sufficiently small particle diameters to improve contact area with exhaust gas. The mean particle diameter of the catalyst metal (a mean value of particle diameters determined by observation with a transmission electron microscope (TEM)) may be approximately 1 nm to 15 nm, for example, 10 nm or less, further 5 nm or less. The amount of the catalyst metal carried may be, in terms of oxide, approximately 20 g or less, typically 1.5 g to 10 g, for example, 2.5 g to 5.5 g, per 1 L of the exhaust gas purification catalyst 10 (the base material 11). The reduction in the content of the catalyst metal allows reduction in the cost. The catalyst metal may be carried uniformly along the cylinder axis direction X, or for example, the amount of the catalyst metal carried may be changed gradually from the upstream side toward the downstream side.

The carrying material 21 carries a catalyst metal. The carrying material 21 is typically in a form of powder (granule) The carrying material 21 may be an inorganic porous body having a larger specific surface area. The carrying material 21 used is, for example, preferably a metal oxide having a high heat resistance or a solid solution thereof. Typical examples of the carrying material 21 include: rare-earth metal oxides such as aluminum oxide ($Al_2O_3$, alumina), titanium oxide ($TiO_2$, titania), zirconium oxide ($ZrO_2$, zirconia), silicon oxide ($SiO_2$, silica), yttrium oxide ($Y_2O_3$, yttria), lanthanum oxide ($La_2O_3$), cerium oxide ($CeO_2$, ceria), and neodymium oxide ($Nd_2O_3$); alkaline earth metal oxides such as magnesium oxide (MgO, magnesia); alkali metal oxide, and solid solutions thereof such as a $CeO_2$—$ZrO_2$ composite oxide containing ceria and zirconia and a $La_2O_3$—$Al_2O_3$ composite oxide containing lanthanum oxide and alumina. These typical examples may be used alone or in combination of two or more kinds of them.

In the present embodiment, the carrying material 21 includes an OSC material 22 having an oxygen storage capacity, and a carrier (hereinafter also referred to as non-OSC material) 23 other than the OSC material. The non-OSC material 23 has no oxygen storage capacity. The OSC material 22 and the non-OSC material 23 carry the catalyst metal on their surfaces. This allows for a relatively better dispersion and carrying of the catalyst metal, compared with, for example, the case where either one of the OSC material 22 or the non-OSC material 23 carries the catalyst metal. Accordingly, the degradation of the catalyst metal (e.g., sintering due to particle growth) can be substantially prevented, and the durability of the exhaust gas purification catalyst 10 can be improved.

The OSC material 22 and the non-OSC material 23 are typically different from each other in composition. In general, the non-OSC material 23 is relatively less prone to change its structure due to redox, thereby typically having a higher heat resistance than the OSC material 22. The heat resistance of the carrying material 21 can be determined based on the degree of reduction in the specific surface area of the carrying material 21 after being exposure to a specific temperature (e.g., 1000° C.). To substantially prevent the exhaust gas purification catalyst 10 from degrading over time, the OSC material 22 and the non-OSC material 23 are suitably different from each other in main component (e.g., an oxide) (a component in the largest proportion by mass, preferably a component in proportion of 50% by mass or more).

The OSC material 22 may be a metal oxide (Ce-containing oxide) containing ceria which has a high oxygen storage capacity. The OSC material 22 may be made mainly of at least one of zirconium, titanium, or silicon, for example. The Ce-containing oxide may contain ceria and/or a composite oxide of ceria and a metal oxide other than ceria. The $CeO_2$—$ZrO_2$ composite oxide is suitable to improve the heat resistance of the OSC material 22. The $CeO_2$—$ZrO_2$ composite oxide may be made mainly of Ce or Zr. The ratio of ceria blended is approximately 1% to 60% by mass, typically 5% to 55% by mass, preferably 10% to 50% by mass, for example, 15% to 45% by mass, relative to 100% by mass of the total $CeO_2$—$ZrO_2$ composite oxide. The ratio of ceria blended being the predetermined value or more improves the oxygen storage capacity. The ratio of ceria blended being the predetermined value or less improves the heat resistance. The ratio of ceria in the above-described range can achieve both high oxygen storage capacity and high heat resistance at high level. The $CeO_2$—$ZrO_2$ composite oxide may further contain a metal oxide other than $CeO_2$, for example, a rare-earth metal oxide, to improve the heat resistance. When the OSC material 22 is a Ce-containing oxide, the non-OSC material 23 may be a ceria-free metal oxide (non-Ce oxide).

In some aspects, the non-OSC material 23 may be an inorganic oxide having high durability (particularly heat resistance). For example, the non-OSC material may be an Al-containing metal oxide (Al-containing oxide) or a Zr-containing metal oxide (Zr-containing oxide). The non-OSC material 23 may be made mainly of inorganic oxide (e.g., alumina and zirconia) to improve the heat resistance of the non-OSC material 23. The non-OSC material 23 made mainly of an inorganic oxide having high heat resistance allows the heat resistance to be maintained high even having a small mean particle diameter, for example Alumina may be γ-alumina, δ-alumina, θ-alumina, or α-alumina. Al-containing oxide may contain alumina and/or a composite oxide of alumina and a metal oxide (e.g., a rare-earth metal oxide) other than alumina. The ratio of the metal oxide blended other than alumina may be approximately less than 50% by mass, typically 0.1% to 20% by mass, for example, 1% to 10% by mass, relative to 100% by mass of the total composite oxide. When the non-OSC material 23 is an Al-containing oxide, the OSC material 22 may be an alumina-free metal oxide (non-Al oxide).

In the present embodiment, the OSC material 22 and the non-OSC material 23 are different from each other in the mean particle diameter. Specifically, the mean particle diameter Dx of the OSC material 22 is larger than the mean particle diameter Dy of the non-OSC material 23. That is, Dx and Dy satisfy Dy<Dx. The "mean particle diameter Dx, Dy" of the carrying material 21 in the carrying material 21 herein is a particle diameter corresponding to the mean particle diameter at a cumulative value of 50% of small particle side in a volume-based frequency particle size distribution determined by observing a cross section of the catalyst layer 20 with an electron microscopy and analyzing the obtained observation image with image processing software Image J. The detailed calculation way will be described in the examples.

The ratio (Dx/Dy) of the mean particle diameter Dx of the OSC material 22 to the mean particle diameter Dy of the non-OSC material 23 exceeds 1, approximately 1.1 or more, 1.2 or more, preferably 1.3 or more, for example, 1.5 or more, and approximately 50 or less, for example, 20 or less, 15 or less, 10 or less, 7 or less, 5 or less. The ratio (Dx/Dy) being the predetermined value or more allows the catalyst layer 20 to be appropriately dense, and allows the catalyst layer 20 to be thin. This can further reduce the pressure drop. The ratio (Dx/Dy) being the predetermined value or less allows the catalyst layer 20 to be substantially prevented from excessively dense, and allows improvement in gas diffusivity in the catalyst layer 20 and the degree of contact between exhaust gas and the OSC material 22.

The OSC material 22 has a mean particle diameter Dx of 1.5 μm or more. Typically, the larger the mean particle diameter Dx is, the further the heat resistance is improved. The mean particle diameter Dx being a predetermined value or more allows the heat resistance above the predetermined level to be imparted to the OSC material 22. The mean particle diameter Dx of the OSC material 22 is, for example, preferably 1.6 μm or more, for example, 1.65 μm or more, 1.7 μm or more, 1.8 μm or more, 1.9 μm or more, 1.95 μm or more, and approximately 20 μm or less, preferably 15 μm or less, 14 μm or less, for example, 10 μm or less, 5 μm or less, and 4 μm or less. The numerical value of Dx in the above-described range allows a contact area between exhaust gas and the catalyst layer 20 (e.g., the OSC material 22) to be maintained wide, and allows purifying performance to be improved. Accordingly, the advantages of the technology disclosed herein is exhibited at higher level.

Although not particularly limited thereto, the average particle diameter Dy of the non-OSC material 23 is approximately 0.1 μm or more, preferably 0.3 μm or more, for example, 0.5 μm or more, 0.7 μm or more, and approximately 5 μm or less, preferably 3 μm or less, for example, 2 μm or less, 1.5 μm or less. The numerical value of Dy in the above-described range allows the durability and the heat resistance of the catalyst layer 20 (particularly, the non-OSC material 23) to be improved suitably. Further, the catalyst layer 20 can be substantially prevented from being excessively dense, and the gas diffusivity in the catalyst layer 20 can be improved. Accordingly, the advantages of the technology disclosed herein an be exhibited at higher level.

The catalyst layer 20 may be made mainly of the OSC material 22 or the non-OSC material 23, for example Although not particularly limited thereto, the content ratio of the non-OSC material 23 in the catalyst layer 20 may be approximately 5 parts by mass or more, preferably 10 parts by mass or more, 20 parts by mass or more, for example, 25 parts by mass or more, and approximately 500 parts by mass or less, preferably 300 parts by mass or less, for example, 200 parts by mass or less relative to 100 parts by mass of the OSC material 22. The content ratio between the OSC material 22 and the non-OSC material 23 may be, for example, 1:10 to 10:1, 1:5 to 5:1, and 1:2 to 2:1. The content ration in the above range substantially prevents the catalyst layer 20 from being excessively dense, and allows gas diffusivity in the catalyst layer 20 and the degree of contact between exhaust gas and the OSC material 22 to be improved.

Although not particularly limited thereto, the molding amount (coating amount) of the carrying material 21 on the catalyst layer 20 may be approximately 30 g to 300 g, preferably 50 g to 200 g, for example, 100 g to 150 g, per 1 L of the volume of the exhaust gas purification catalyst 10 (the volume of the base material 11). The coating amount of the OSC material 22 on the catalyst layer 20 may be approximately 5 g to 200 g, preferably 30 g to 150 g, for example, 40 g to 80 g, per 1 L of the volume of the exhaust gas purification catalyst 10 (the volume of the base material 11). The coating amount of the non-OSC material 23 on the catalyst layer 20 may be approximately 10 g to 200 g, preferably 30 g to 150 g, for example, 40 g to 80 g, per 1 L of the volume of the exhaust gas purification catalyst 10 (the volume of the base material 11). The coating amount being the predetermined value or more substantially prevents the catalyst layer 20 from being excessively dense, and allows gas diffusivity in the catalyst layer 20 to be improved. The coating amount being the predetermined value or less allows the reduction in the pressure drop of the catalyst layer 20. The coating amount in the above-described range can achieve both the reduction in the pressure drop and the improvement in the exhaust gas purification performance at high level. The "molding amount" herein refers to the mass of solids contained per unit volume.

The catalyst layer 20 may further contain an optional component, as appropriate, besides the catalyst metal and the carrying material 21. If the catalyst layer 20 contains, as a catalyst metal, an oxidation catalyst (e.g., at least one of Pd or Pt), the catalyst layer 20 preferably further contains an alkaline earth element such as calcium (Ca) and barium (Ba). This can further improve an oxygen absorption amount in a lean atmosphere. Further, this can reduce poisoning of the oxidation catalyst, and improve the catalytic activity. Furthermore, dispersibility of the oxidation catalyst is enhanced, thereby substantially preventing the growth of particles of the oxidation catalyst at higher level. The alkaline earth element present in the catalyst layer 20 is typically in a form of oxide. The content of the alkaline earth element may be approximately 0.1 g to 30 g, preferably 0.5 g to 20 g, for example, 1 g to 15 g in terms of barium sulfate, per 1 L of the volume of the exhaust gas purification catalyst 10 (the volume of the base material 11). The content of the alkaline earth element is approximately 10 parts by mass to 200 parts by mass, preferably 20 parts by mass to 150 parts by mass, for example, 30 parts by mass to 150 parts by mass, relative to 100 parts by mass of the OSC material 22.

In addition, examples of the optional component to be contained in the catalyst layer 20 include an OSC material carrying no catalyst metal, a non-OSC material carrying no catalyst metal, and NOx absorbent having a NOx storage capacity, and a stabilizing agent. In some aspects, the catalyst layer 20 contains a stabilizing agent. Examples of the stabilizing agent include rare-earth elements other than Ce, such as yttrium (Y), lanthanum (La), and neodymium (Nd). This can improve the specific surface area of the catalyst layer 20 at high temperatures without inhibiting the catalytic function. The rare-earth element present in the catalyst layer 20 is typically in a form of oxide.

The thickness of the catalyst layer 20 may be designed, as appropriate, according to the sizes of the cells 12 of the base material 11, for example. In some aspects, the thickness of the catalyst layer 20 is approximately 5 μm to 500 μm, preferably 10 μm to 200 μm, for example, 30 μm to 100 μm. This allows both the reduction in the pressure drop and the improvement in the exhaust gas purification performance at high level.

The catalyst layer 20 may not necessarily uniform throughout the overall length of the base material 11 in the cylinder axis direction X. In the cylinder axis direction X, the catalyst layer 20 may be provided continuously or intermittently over approximately 20% or more, preferably 40% to 100%, for example, 50% to 80%, of the overall length of the base material 11. Accordingly, the advantages of the technology disclosed herein can be exhibited at higher level.

The exhaust gas purification catalyst 10 may include two or more layers of the catalyst layer. In such a case, at least one layer is required to satisfy the configuration of the catalyst layer 20. The catalyst layer 20 may be a monolayer or two or more layers. The catalyst layer 20 may contain a catalyst layer other than the catalyst layer 20, a layer which is not a catalyst layer, e.g., a catalyst metal-free layer, or the like. The exhaust gas purification catalyst 10 may further contain a different catalyst layer from the catalyst layer 20 in the cylinder axis direction X, for example. In some aspects, the exhaust gas purification catalyst 10 may have catalyst layers with different compositions in different portions of the base material 11, e.g., a portion on the upstream side X1 and a portion on the downstream side X2 in the cylinder axis direction X. In such a case, the catalyst layer 20 may be either portion. The catalyst layer 20 may be provided along the cylinder axis direction X from the inlet 10$a$ for exhaust gas, or along the cylinder axis direction X from the outlet 10$b$ for exhaust gas, for example.

The method of producing the exhaust gas purification catalyst 10 may be the same as conventional one except that the mean particle diameter of the carrying material 21 for a catalyst layer forming slurry is adjusted in advance. The exhaust gas purification catalyst 10 may be produced by the following method, for example Specifically, first, a base material 11 and a slurry for forming the catalyst layer 20 are provided. Separate slurries may be suitably provided for layers formed, as necessary. The catalyst layer forming slurry may contains, as essential raw components, a catalyst metal source (e.g., a solution containing a catalyst metal as ions) and two kinds of carrying materials 21 described above (i.e., the OSC material 22 and the non-OSC material 23), and may contain, as other optional components, for example, a binder, various additives, and the like which are dispersed in a dispersion medium. As the binder, alumina sol or silica sol may be used, for example. As the dispersion medium, water or an aqueous solvent may be used, for example Properties of the slurry, e.g., the viscosity, the solid content, and the like of the slurry may be adjusted, as appropriate, according to the size of the base material 11 used, the form of the cells 12 (partitions 14), required characteristics of the catalyst layer 20, and the like.

The mean particle diameter of the carrying material 21 (as a raw material) used in a catalyst layer forming slurry is preferably adjusted by conventionally known wet grinding or dry grinding in advance, for example. The mean particle diameter of the whole carrying material 21 (as a raw material) used in a catalyst layer forming slurry may be adjusted to be approximately 0.01 µm to 50 µm, preferably 0.05 µm to 30 µm, for example, 0.1 µm to 20 µm. The mean particle diameter db of the non-OSC material 23 (as a raw material) may be adjusted to be approximately 0.01 µm or more, preferably 0.05 µm or more, for example 0.1 µm or more, and approximately 10 µm or less, preferably 5 µm or less, further 3 µm or less, 2 µm or less, for example, 1 µm or less. The mean particle diameter Da of the OSC material 22 (as a raw material) may be adjusted to be typically larger than the mean particle diameter db of the non-OSC material 23, and is approximately 1 µm or more, preferably 2 µm or more, for example, 4 µm or more, and approximately 30 µm or less, preferably 20 µm or less, for example, 15 µm or less.

The ratio (Da/db) of the mean particle diameter Da of the OSC material 22 to the mean particle diameter db of the non-OSC material 23 may exceed 1, may be preferably 1.2 or more, 1.3 or more, 1.5 or more, for example, 2 or more, further 5 or more, and approximately 100 or less, 90 or less, preferably 50 or less, 40 or less, for example, 20 or less, 15 or less. This can suitably achieve the configuration of the catalyst layer 20 after firing, for example, the following relationship: (the mean particle diameter Dy of the non-OSC material 23)<(the mean particle diameter Dx of the OSC material 22) suitably. Further, many micron-order voids (e.g., voids with a diameter of about 5 µm to about 10 µm) can be formed in the catalyst layer 20, thereby improving dispersibility of exhaust gas. The "mean particle diameter Da, db" of the carrying material 21 (as a raw material) in the catalyst layer forming slurry is a particle diameter (equivalent volume diameter) corresponding to the mean particle diameter at a cumulative value of 50% of small particle side in a volume-based particle size distribution determined by laser diffraction/scattering method. The mean particle diameters Da and db are typically different from the mean particle diameters Dx and Xy of the catalyst layer 20 after firing.

Subsequently, the provided catalyst layer forming slurry may flow into cells 12 from an end of the base material 11 to reach a predetermined length along the cylinder axis direction X. The slurry may be supplied from either the inlet 10$a$ or the outlet 10$b$. For example, the slurry may flow in from the inlet 10$a$ toward the downstream side X2 to reach the predetermined length. Alternatively, the slurry may flow in from the outlet 10$b$ toward the upstream side X1 to reach the predetermined length. In such a case, the excessive amount of the slurry may be sucked from the opposite end. Alternatively, the excessive amount of the slurry may be discharged from the cells 12 by blowing air from the opposite end. Thereafter, for each slurry, the base material 11 supplied with the slurry may be dried and fired at a predetermined temperature for a predetermined time. The drying and firing ways may be the same as conventional ones. Thus, the raw material components are fired, whereby a porous catalyst layer 20 is formed on the base material 11. In this manner, the catalyst layer 20 is formed on the surfaces of the partitions 14 of the base material 11.

Second Embodiment

Figure 4:
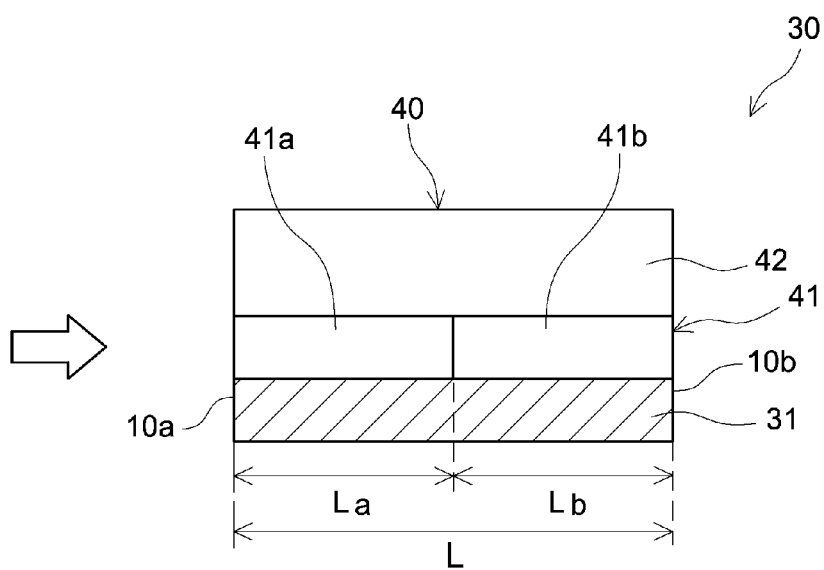
FIG. 4 is a schematic cross-sectional view of a catalyst layer according to a second embodiment.

FIG. 4 is a cross-sectional view of an enlarged portion of an exhaust gas purification catalyst 30 of the second embodiment cut along the cylinder axis direction X. The exhaust gas purification catalyst 30 of the present embodiment includes: a base material 31; and a catalyst layer 40 with a multilayer structure provided on the base material 31. The base material 31 may be the same as the base material 11 of the first embodiment described above. In FIG. 4, the catalyst metal and the carrying material 21 are not shown. Hereinafter, a portion of the catalyst layer 40 near the inlet 10$a$ may be referred to as an early-stage portion, and the other portion near the outlet 10$b$ may be referred to as a later-stage portion, assuming that the catalyst layer 40 is divided into two in the cylinder axis direction X. Further, the description of portions which are the same as those of the first embodiment is omitted or simplified, and the differences of the second embodiment from the first embodiment will be described.

The catalyst layer 40 is formed to have a lamination structure having at least two layers of a lower layer 41 in contact with the surface of the base material 31 and an upper layer 42 provided on the surface of the lower layer 41. In the present embodiment, the upper layer 42 forms a surface layer portion in the lamination structure of the catalyst layer 40. In the lamination direction of the catalyst layer 40, one additional layer or two or more additional layers may be further provided, for example, on the surface of the upper layer 42, between the lower layer 41 and the upper layer 42, and between the base material 31 and the lower layer 41.

In some aspects, at least the lower layer 41 suitably satisfies the configuration of the catalyst layer 20 of the first embodiment. For example, only the lower layer 41 or each of the lower layer 41 and the upper layer 42 may satisfy the configuration of the catalyst layer 20 of the first embodiment. At least the upper layer 42 may satisfy the configuration of the catalyst layer 20 of the first embodiment. The lower layer 41 and the upper layer 42 each typically is a catalyst layer including: a catalyst metal; and a carrying material 21 carrying the catalyst metal.

The lower layer 41 suitably contains, as a catalyst metal, an oxidation catalyst (e.g., at least one of Pd or Pt). The upper layer 42 suitably contains a catalyst metal different from the catalyst metal of the lower layer 41, e.g., a reduction catalyst. The lower layer 41 carrying Pd and the upper layer 42 carrying Rh are more suitable. Separately carrying the oxidation catalyst and the reduction catalyst in the lamination direction can substantially prevent degradation of the catalyst metal (e.g., sintering with particle growth), and can improve durability of the exhaust gas purification catalyst 10. The upper layer 42 may carry the catalyst metal in a smaller amount than the catalyst metal carried on the lower layer 41. The oxidation catalyst and the reduction catalyst may be present in the same layer. Alternatively, for example, the lower layer 41 may carry either one of the oxidation catalyst or the reduction catalyst, and the upper layer 42 may carry the other.

In the present embodiment, the lower layer 41 includes an inflow-side lower layer 41a located on the upstream side X1 and an outflow-side lower layer 41b located on the downstream side X2, in the cylinder axis direction X. The inflow-side lower layer 41a and the outflow-side lower layer 41b each satisfy the configuration of the catalyst layer 20 of the first embodiment. The lower layer 41 may be formed of a monolayer, or may further include one additional layer or two or more additional layers. Alternatively, one of the inflow-side lower layer 41a or the outflow-side lower layer 41b may not satisfy the configuration of the catalyst layer 20 of the first embodiment. The inflow-side lower layer 41a and the outflow-side lower layer 41b are each typically a catalyst layer including: a catalyst metal; and a carrying material 21 carrying the catalyst metal. The carrying material 21 of each of the inflow-side lower layer 41a and the outflow-side lower layer 41b may contain an OSC material 22 and a non-OSC material 23.

The inflow-side lower layer 41a and the outflow-side lower layer 41b may be different from each other in composition. For example, the inflow-side lower layer 41a and the outflow-side lower layer 41b are different from each other in at least one of the kind of the catalyst metal, the amount of the catalyst metal carried, the kind of the carrying material 21, the coating amount of the carrying material 21, the coating amount of the OSC material 22, or the coating amount of the non-OSC material 23. In some aspects, the amount of the catalyst metal carried on the inflow-side lower layer 41a may be larger than the amount of the catalyst metal carried on the outflow-side lower layer 41b. In such a case, the amount of the catalyst metal carried satisfies the later-stage portion<the early-stage portion. The amount of the catalyst metal carried on the inflow-side lower layer 41a may be 1.5 times or more, further 2 times or more, for example, 2 times to 5 times the amount of the catalyst metal carried on the outflow-side lower layer 41b, for example. In some aspects, the catalyst metal is carried uniformly along the cylinder axis direction X, and the amount of the catalyst metal carried on the inflow-side lower layer 41a is the same as that on the outflow-side lower layer 41b.

Further, in some aspects, the coating amount of the carrying material 21 on the inflow-side lower layer 41a is less than that on the outflow-side lower layer 41b. In such a case, the coating amount of the carrying material 21 satisfies the later-stage portion<the early-stage portion. This can reduce the pressure drop when exhaust gas flows in the cells 12. In some aspects, the coating amount of the OSC material 22 on the inflow-side lower layer 41a is less than the coating amount of the OSC material 22 on the outflow-side lower layer 41b. In such a case, the coating amount of the OSC material 22 satisfies the early-stage portion<the later-stage portion. On the other hand, the coating amount of the non-OSC material 23 on the inflow-side lower layer 41a is larger than the coating amount of the non-OSC material 23 on the outflow-side lower layer 41b. In such a case, the coating amount of the non-OSC material 23 satisfies the later-stage portion<the early-stage portion. This allows the durability (especially the heat resistance) of the carrying material 21 to be improved, and allows the exhaust gas purification catalyst to have both the oxygen storage capacity and the heat resistance at high level for a long period of time.

Although not particularly limited thereto, the inflow-side lower layer 41a may be provided continuously from the inlet 10a throughout a portion corresponding to approximately 25% or more, preferably 40% to 100%, for example, 50% to 80% of the overall length L of the base material 31 along the cylinder axis direction X. The outflow-side lower layer 41b may be formed continuously from the outlet 10b throughout a portion corresponding to approximately 25% or more, preferably 40% to 100%, for example, 50% to 80% of the overall length of the base material 31 along the cylinder axis direction X. In FIG. 4, the inflow-side lower layer 41a is formed from the inlet 10a of the base material 31 toward the outlet 10b throughout a portion (La=½L) corresponding to 50% of the overall length L of the base material 31. The outflow-side lower layer 41b is formed from the outlet 10b of the base material 31 toward the inlet 10a throughout a portion (Lb=½L) corresponding to 50% of the overall length L of the base material 31. The lower layer 41 is continuously formed on the surface of the base material 31 with the same length as the overall length L. The inflow-side lower layer 41a and the outflow-side lower layer 41b may overlap near the center of the cylinder axis direction X. For example, the inflow-side lower layer 41a and the outflow-side lower layer 41b may be stacked vertically near the center of the cylinder axis direction X with a length of approximately ¹⁄₁₀ L to ⅓ L, for example, ⅕ L to ¼ L, to have a three-layer structure of the inflow-side lower layer 41a, the outflow-side lower layer 41b, and the upper layer 42.

The carrying material 21 of the upper layer 42 may contain the OSC material 22 and the non-OSC material 23, or either one of them, for example. In some aspects, the lower layer 41 and the upper layer 42 both containing the OSC material allow the degree of contact between exhaust gas and the OSC material 22 to be improved, and an action to mitigate atmospheric variations to be effectively enhanced. In some aspects, the coating amount of the OSC material 22 on the upper layer 42 is higher than that on the inflow-side lower layer 41a. In some aspects, the coating amount of the OSC material 22 on the upper layer 42 is less than that on the outflow-side lower layer 41b. In some aspects, the coating amount of the non-OSC material 23 on the upper layer 42 is less than that on the inflow-side lower layer 41a. In some aspects, the coating amount of the non-OSC material 23 on the upper layer 42 is higher than that on the outflow-side lower layer 41b. This allows the exhaust gas purification catalyst to have both the oxygen storage capacity and the heat resistance at high level for a long period of time.

As described above, the exhaust gas purification catalyst 10, 30 ensures suitable voids in the catalyst layer 20, 40, and has enhanced heat resistance of the OSC material 22. With this configuration, the degree of contact between exhaust gas and the OSC material 22 is suitable, and the OSC material 22 can stably exhibit an oxygen storage capacity even after repeated use. As a result, the exhaust gas purification catalyst 10, 30 is less prone to reduce its catalytic capacity and has high purifying performance for a long period of time.

Some test examples regarding the present invention will be described below. However, it is not intended that the present invention is limited to such test examples.

Test Example 1: Examination of Monolayer

Example 1

In the present embodiment, a catalyst layer with a monolayer structure was formed on a base material by using one kind of slurry. Specifically, first, a honeycomb base material (made of cordierite, a volume: 700 mL, an overall length of the base material: 84 mm, the number of cells: 600, the shape of each cell: hexagonal, the thickness of each partition: 2 mill) was provided. Hereinafter, "L-cat" refers to a solid content per 1 L of the volume of the exhaust gas purification catalyst (the volume of the base material).

Then, the following two kinds of powders of carrying materials were provided.

OSC material: a $CeO_2$—$ZrO_2$ composite oxide containing $CeO_2$=15% to 45% by mass, to which trace amounts of $Nd_2O_3$, $La_2O_3$, $Y_2O_3$, and $Pr_6O_{11}$ have been added and which had been subjected to high heat resistance treatment.

Non-OSC material: a $La_2O_3$—$Al_2O_3$ composite oxide containing $La_2O_3$=1% to 10% by mass Two kinds of the powders were separately subjected to wet grinding to adjust the mean particle diameter Da of the OSC material to 9 μm and the mean particle diameter db of the non-OSC material to 0.5 μm. The mean particle diameters Da and db after the grinding were measured using a laser diffraction/scattering particle size distribution measurement device LA-960 (manufactured by HORIBA).

Then, a Pd solution in nitric acid (2.0 g/L-cat in terms of Pd) and a Rh solution in nitric acid (0.2 g/L-cat in terms of Rh), a non-OSC material (db=0.5 μm, 120 g/L-cat), an OSC material (Da=9 μm, 120 g/L-cat), barium sulfate (10 g/L-cat), and an $Al_2O_3$-based binder were dispersed in a water solvent, which was then stirred to mix, thereby preparing a slurry 1. Then, the slurry 1 was supplied from an end of the honeycomb base material on the upstream side, and unwanted portion of the slurry 1 was blown away by a blower, to coat portions corresponding to 100% of the overall length of the partitions with the materials. This was then heat-dried in a driver set at 120° C. for 2 hours to remove moisture, and then fired in an electric furnace set at 500° C. for 2 hours. Thus, an exhaust gas purification catalyst of Example 1 having one catalyst layer on the surface of the base material was obtained. In the catalyst layer of Example 1, the content ratio of the non-OSC material was 100 parts by mass relative to 100 parts by mass of the OSC material (the non-OSC material:the OSC material=1:1).

Comparative Example 1

In Comparative Example 1, all the conditions were the same as those in Example 1 except for the particle diameters of the raw materials. An exhaust gas purification catalyst of Comparative Example 1 was obtained in the same manner as in Example 1 except that a slurry 2 was prepared by using a $La_2O_3$—$Al_2O_3$ composite oxide with db=7 μm as a non-OSC material and a $CeO_2$—$ZrO_2$ composite oxide with Da=3 μm as an OSC material to form a catalyst layer. Table 1 summarizes the results of the exhaust gas purification catalysts of Example 1 and Comparative Example 1.

[Measurement of Mean Particle Diameter Dx, Dy of Carrying Material]

The exhaust gas purification catalyst was cut along the cylinder axis direction to cut out a test piece. The test piece was embedded and polished. The cross sections of the base material and the catalyst layer were then observed using a scanning electron microscope (SEM) to obtain observation images. The observation magnification was basically 1000×, but when the particle diameter was small, the observation magnification was increased to 4000× or 8000×. Subsequently, the observation images were imported into Image J, which is open-source image analysis software, to be subjected to image analysis in accordance with the following procedures. Thus, the mean particle diameters Dx and Dy of the non-OSC material and the OSC material were measured. Table 1 shows the results.

(1) A SEM reflection electron image file was opened.
(2) A line was drawn to match the scale bar.
(3) In the Set Scale, the length (μm) of the line and pixels were matched.
(4) An image of a portion corresponding to the catalyst layer to be analyzed was cut out.
(6) Threshold of Adjust was selected to automatically binarize the brightness. In this manner, automatic segmentation was performed for the non-OSC material and the OSC material, and the non-OSC material was segmented (classified) as white, and the OSC material was segmented (classified) as black.
(7) A (black) portion corresponding to the OSC material was finely adjusted by manually excluding portions corresponding to voids. Then, the following procedures (8) to (14) were carried out for the non-OSC material and the OSC material.
(8) In Threshold, connecting particles were automatically divided.
(9) In Analyze Particles, areas of the divided particles were obtained. The areas were calculated in the analysis range of 0 to infinity ($\mu m^2$), at the roundness of 0 to 1.0, with excluding particles at the edge of the image and including hollow particles with holes.
(10) In the Distribution, a frequency distribution of the areas was displayed. The display range was 0.005 to 30000 ($\mu m^2$), and the number of pixels was 7.2 million pixels.
(11) The obtained frequency distribution of the areas was converted into the particle diameter (diameter) using the circular approximation.
(12) The volume was calculated from the particle diameter using the spherical approximation, and the volume was multiplied by the frequency.
(13) The total volume of the particles was determined by integration, and the volume fraction of each of the particle diameters was calculated and used as a volume frequency.
(14) A volume frequency distribution was created by plotting the particle diameter versus the volume frequency, and the point where the integration of the volume frequency corresponds to the cumulative value of 50% of small particle side was determined as a mean particle diameter (based on volume).

[Evaluation of NOx Purifying Performance]

The exhaust gas purification catalyst of each of the examples and the comparative examples was attached to V-8 gasoline engine (displacement: 4600 cc), and subjected to a durability test at an average engine speed of 3000 rpm and a catalyst bed temperature of 1000° C. for 50 hours. After the durability test, a catalyst evaluation system equipped with an L-4 gasoline engine (displacement: 2500 cc) was used to evaluate the NOx purifying performance in a simulated exhaust gas of a gasoline-powered vehicle. This catalyst evaluation system is capable of analyzing components of inflow gas flowing into the exhaust gas purification catalyst and outflow gas flowing out of the exhaust gas purification catalyst. Specifically, the exhaust gas purification catalyst of each of the examples and the comparative examples was placed in the catalyst evaluation system, and a temperature rise characteristic (temperature rise rate: 20° C./min) from room temperature (25° C.) to 600° C. was measured while supplying simulated exhaust gas at an air-to-fuel ratio (A/F) of 14.6 and an average engine speed of 3000 rpm. The NOx purification rate was measured from the ratio of the NOx concentration in the inflow gas and the outflow gas. Then, the temperature at which the NOx purification rate reached 50% (NOx-T50) was determined. Table 1 shows the results.

TABLE 1

Examination of Monolayer

| Item | Raw material (Laser diffractometry) | | | Catalyst layer (Image analysis) | | | |
| --- | --- | --- | --- | --- | --- | --- | --- |
| | Db (μm) of non-OSC material | Da (μm) of OSC material | Da/Db | Dy (μm) of non-OSC material | Dx (μm) of OSC material | Dx/Dy | NOx T50 (° C.) |
| Example 1 | 0.5 | 9 | 18.0 | 1.41 | 9.39 | 6.66 | 384 |
| Comparative Example 1 | 7 | 3 | 0.43 | 7.68 | 6.52 | 0.85 | 408 |

As can be seen from Table 1, the NOx-T50 of the exhaust gas purification catalyst of Example 1 satisfying 1.5 μm≤Dx and Dy<Dx had a significantly lower NOx-T50 than the exhaust gas purification catalyst of Comparative Example 1 satisfying Dy>Dx. In other words, the NOx purifying performance after the durability test was high. This is considered to be because setting the particle diameter of the OSC material to be larger than that of the non-OSC material increased the heat resistance of the OSC material and substantially prevented the OSC material from degrading after the durability test.

Test Example 2: Examination of Lower Layer of Upper and Lower Two-Layer Structure

Example 2

In the present embodiment, a catalyst layer with an upper and lower two-layer structure was formed on a base material by using two kinds of slurries with different compositions. Specifically, first, the same OSC material, non-OSC material, and honeycomb base material as those in Example 1 were provided. Then, a Pd solution in nitric acid (0.6 g/L-cat in terms of Pd), a non-OSC material (db=0.5 μm, 35 g/L-cat), an OSC material (Da=9 μm, 50 g/L-cat), barium sulfate (5 g/L-cat), and an Al$_2$O$_3$-based binder were dispersed in a water solvent, which was then stirred to mix, thereby preparing a slurry 3. Then, the slurry 3 was supplied from an end of the honeycomb base material on the upstream side, and unwanted portion of the slurry 3 was blown away by a blower, to coat portions corresponding to 90% of the overall length of the partitions with the materials. This was then heat-dried in a driver set at 120° C. for 2 hours to remove moisture, and then fired in an electric furnace set at 500° C. for 2 hours, to form a lower layer from the upstream side along the cylinder axis direction X.

Then, a Rh solution in nitric acid (0.4 g/L-cat in terms of Rh), a non-OSC material (Dy=7 μm, 60 g/L-cat), an OSC material (Dx=3 μm, 70 g/L-cat), and an Al$_2$O$_3$-based binder were dispersed in a water solvent, which was then stirred to mix, thereby preparing a slurry 4. Then, the slurry 4 was supplied from an end of the upstream side of the base material with the catalyst layer, and unwanted portion of the slurry 4 was blown away by a blower, to coat portions corresponding to 100% of the overall length of the partitions with the material. This was then heat-dried in a driver set at 120° C. for 2 hours to remove moisture, and then fired in an electric furnace set at 500° C. for 2 hours, to form an upper layer from the upstream side along the cylinder axis direction X. In this way, an exhaust gas purification catalyst of Example 2 having two catalyst layers of a lower layer (90% of the overall length of the partitions) formed on the base material and an upper layer (100% of the overall length of the partitions) formed on the surface of the lower layer was obtained.

Comparative Example 2

In Comparative Example 2, all the conditions were the same as those in Example 2 except for the particle diameters of the raw materials of the lower layer. Specifically, an exhaust gas purification catalyst of Comparative Example 2 was obtained in the same manner as in Example 2 except that a slurry was prepared by using a La$_2$O$_3$—Al$_2$O$_3$ composite oxide with db=7 μm as a non-OSC material and a CeO$_2$—ZrO$_2$ composite oxide with Da=3 μm as an OSC material when a lower layer was formed. The mean particle diameters Dx and Dy of the carrying materials were measured, and the NOx purifying performance was evaluated in the same manner as in Test Example 1. Table 2 shows the results.

TABLE 2

Examination of Lower Layer

| Item | Raw material (Laser diffractometry) | | | Catalyst layer (Image analysis) | | | |
| --- | --- | --- | --- | --- | --- | --- | --- |
| | Db (μm) of non-OSC material | Da (μm) of OSC material | Da/Db | Dy (μm) of non-OSC material | Dx (μm) of OSC material | Dx/Dy | NOx T50 (° C.) |
| Example 2 | 0.5 | 9 | 18.0 | 0.81 | 13.26 | 16.37 | 311 |
| Comparative Example 2 | 7 | 3 | 0.43 | 3.55 | 1.48 | 0.42 | 327 |

In the exhaust gas purification catalyst of Example 2, the lower layer satisfied 1.5 μm≤Dx and Dy<Dx. In the exhaust gas purification catalyst of Comparative Example 2, the upper layer and the lower layer both did not satisfy 1.5 μm≤Dx and Dy<Dx. As can be seen from Table 2, the NOx-T50 of the exhaust gas purification catalyst of Example 2 was relatively lower than that of Comparative Example 2. In other words, the NOx purifying performance after the durability test was high. These results demonstrated as follows. If at least one of two or more layers satisfies Dy<Dx, in the exhaust gas purification catalyst including a catalyst layer having a lamination structure of the two or more layers, the advantages of the technology disclosed herein can be exhibited.

Test Example 3: Examination of Lower Layer of Upper and Lower Two-Layer Structure Example 3

In the present embodiment, a catalyst layer with an upper and lower two-layer structure was formed by using three kinds of slurries with different compositions, by forming, on a base material, a catalyst layer (lower layer) with different configurations on the upstream side and the downstream side in the exhaust gas flow direction, and then forming an upper layer thereon.

Specifically, first, the same base material as that of Example 1 was provided. Then, a slurry 5 was prepared in the same manner as for the slurry 1 except that the content of the Pd solution in nitric acid was 0.5 g/L-cat in terms of Pd, the content of the non-OSC material was 30 g/L-cat, the content of the OSC material was 50 g/L-cat, and the content of barium sulfate was 15 g/L-cat. Then, the slurry 5 was supplied from an end of the honeycomb base material on the outflow side, and unwanted portion of the slurry 5 was blown away by a blower, to coat portions corresponding to 70% of the overall length of the partitions with the material. This was then heat-dried in a driver set at 120° C. for 2 hours to remove moisture, and then fired in an electric furnace set at 500° C. for 2 hours, to form an outflow-side lower layer from the downstream side along the cylinder axis direction X.

Then, a Pd solution in nitric acid (1.5 g/L-cat in terms of Pd), a non-OSC material (db=0.5 μm, 55 g/L-cat), an OSC material (Da=9 μm, 15 g/L-cat), barium sulfate (15 g/L-cat), and an Al$_2$O$_3$-based binder were dispersed in a water solvent, which was then stirred to mix, thereby preparing a slurry 6. Then, the slurry 6 was supplied from an end of the upstream side of the base material with the catalyst layer, and unwanted portion of the slurry 6 was blown away by a blower, to coat portions corresponding to 70% of the overall length of the partitions with the material. This was then heat-dried in a driver set at 120° C. for 2 hours to remove moisture, and then fired in an electric furnace set at 500° C. for 2 hours, to form an inflow-side lower layer from the upstream side along the cylinder axis direction X.

Then, a Rh solution in nitric acid (0.2 g/L-cat in terms of Rh), a non-OSC material (db=7 μm, 40 g/L-cat), an OSC material (Dx=3 μm, 40 g/L-cat), and an Al$_2$O$_3$-based binder were dispersed in a water solvent, which was then stirred to mix, thereby preparing a slurry 7. Then, the slurry 7 was supplied from an end on the upstream side of the base material, and unwanted portion of the slurry 7 was blown away by a blower, to coat portions corresponding to 80% of the overall length of the partitions with the material. This was then heat-dried in a driver set at 120° C. for 2 hours to remove moisture, and then fired in an electric furnace set at 500° C. for 2 hours, to form an upper layer from the upstream side along the cylinder axis direction X. In this way, an exhaust gas purification catalyst of Example 3 having three catalyst layers of an inflow-side lower layer formed on the surface of base material on the upstream side, an outflow-side lower layer formed on the surface of the base material on the downstream side, and an upper layer formed on the surfaces of the inflow-side lower layer and the outflow-side lower layer was obtained. In the lower layer of Example 3, the content ratio of the non-OSC material was 130 parts by mass relative to 100 parts by mass of the OSC material (the non-OSC material: the OSC material=13:10). In the upper layer of Example 3, the content ratio of the non-OSC material was 100 parts by mass relative to 100 parts by mass of the OSC material (the non-OSC material: the OSC material=1:1).

Examples 4 to 9 and Comparative Examples 3 to 7 and 9

The exhaust gas purification catalysts of Examples 4 to 9 and Comparative Examples 3 to 7 and 9 were obtained in the same manner as in Example 3 except that the non-OSC materials and the OSC materials having mean particle diameters Da and db shown in Table 3 were used when inflow-side lower layers and outflow-side lower layers were formed.

Comparative Example 8

An exhaust gas purification catalyst of Comparative Example 8 was obtained in the same manner as in Example 3 except that two kinds of powders having different mean particle diameters db (La$_2$O$_3$—Al$_2$O$_3$ composite oxides having db=0.5 μm and 40 μm) as a non-OSC material, and two kinds of powders having different mean particle diameters Da (CeO$_2$—ZrO$_2$ composite oxides having Da=0.5 μm and 9 μm) as an OSC material were used at a volume ratio of 1:1 when an inflow-side lower layer and an outflow-side lower layer were formed. The mean particle diameters Da and db were each the arithmetic mean of the two kinds of powders. The mean particle diameters Dx and Dy of the carrying materials were measured, and the NOx purifying performance was evaluated in the same manner as in Test Example 1. Table 3 shows the results.

TABLE 3

Examination of Lower Layer

| Item | Raw material (Laser diffractometry) | | | Catalyst layer (Image analysis) | | | |
|---|---|---|---|---|---|---|---|
| | Db (μm) of non-OSC material | Da (μm) of OSC material | Da/Db | Dy (μm) of non-OSC material | Dx (μm) of OSC material | Dx/Dy | NOx T50 (° C.) |
| Example 3 | 0.5 | 9 | 18.0 | 1.24 | 8.43 | 6.80 | 366 |
| Example 4 | 0.5 | 4 | 8.0 | 1.14 | 2.06 | 1.81 | 366 |
| Example 5 | 0.5 | 7 | 14.0 | 1.40 | 2.10 | 1.50 | 363 |
| Example 6 | 0.3 | 4 | 13.3 | 0.78 | 1.96 | 2.51 | 367 |
| Example 7 | 0.7 | 4 | 5.7 | 2.57 | 3.49 | 1.36 | 370 |
| Example 8 | 2 | 4 | 2.0 | 1.69 | 2.49 | 1.47 | 366 |
| Example 9 | 0.1 | 4 | 40.0 | 0.38 | 1.96 | 5.16 | 369 |
| Comparative Example 3 | 7 | 3 | 0.43 | 5.80 | 2.30 | 0.40 | 377 |
| Comparative Example 4 | 0.5 | 2 | 4.0 | 1.24 | 1.25 | 1.01 | 379 |
| Comparative Example 5 | 40 | 0.5 | 0.01 | 28.62 | 3.18 | 0.11 | 379 |
| Comparative Example 6 | 3 | 4 | 1.3 | 5.26 | 3.83 | 0.73 | 379 |
| Comparative Example 7 | 9 | 0.5 | 0.06 | 7.44 | 2.61 | 0.35 | 375 |
| Comparative Example 8 | 20.3 | 4.8 | 0.23 | 17.68 | 3.25 | 0.18 | 379 |
| Comparative Example 9 | 40 | 2 | 0.05 | 9.78 | 1.55 | 0.16 | 379 |

Figure 5:
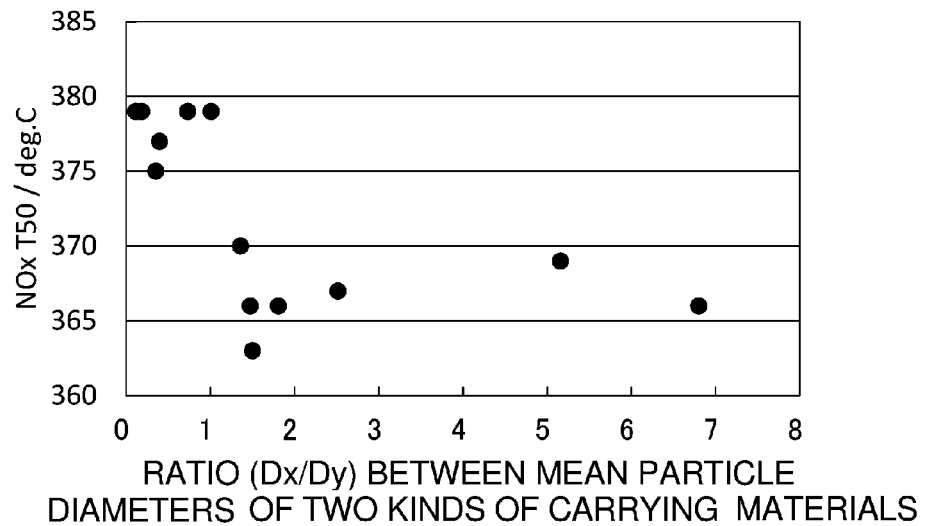
FIG. 5 is a graph showing a relationship between the ratio (Dx/Dy) of the mean particle diameters of carrying materials and NOx-T50.

FIG. 5 is a graph showing a relationship between the ratio (Dx/Dy) of the mean particle diameter of carrying materials and NOx-T50. In the exhaust gas purification catalysts of Examples 3 to 9, the lower layer satisfies 1.5 μm≤Dx and Dy<Dx. In the exhaust gas purification catalysts of Comparative Examples 3 to 8, each of the upper layer and the lower layer did not satisfy at least one of 1.5 μm≤Dx or Dy<Dx. As can be seen from FIG. 5 and Table 3, the NOx-T50 of the exhaust gas purification catalysts of Examples 3 to 9 were relatively lower than those of Comparative Examples 3 to 8. In other words, the NOx purifying performance after the durability test was high. It should be noted that the same tendency was observed when the ratio between the content of the OSC material and the content of the non-OSC material in the lower layer is the non-OSC material: the OSC material=1:4 (25 parts by mass of the content ratio of the non-OSC material relative to 100 parts by mass of the content of the OSC material) in Examples 3 to 9 and Comparative Examples 3 to 8.

Figure 6:
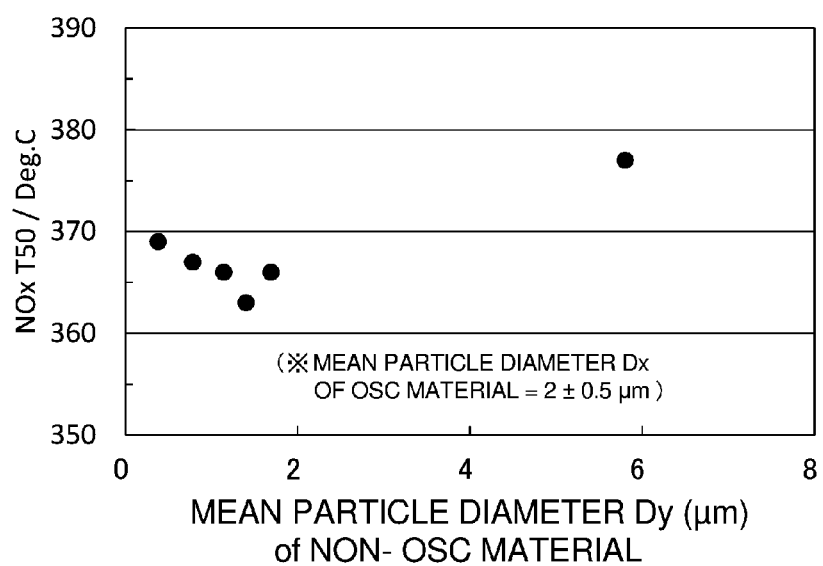
FIG. 6 is a graph showing a relationship between the mean particle diameter Dy of the non-OSC material and NOx-T50.
Figure 7:
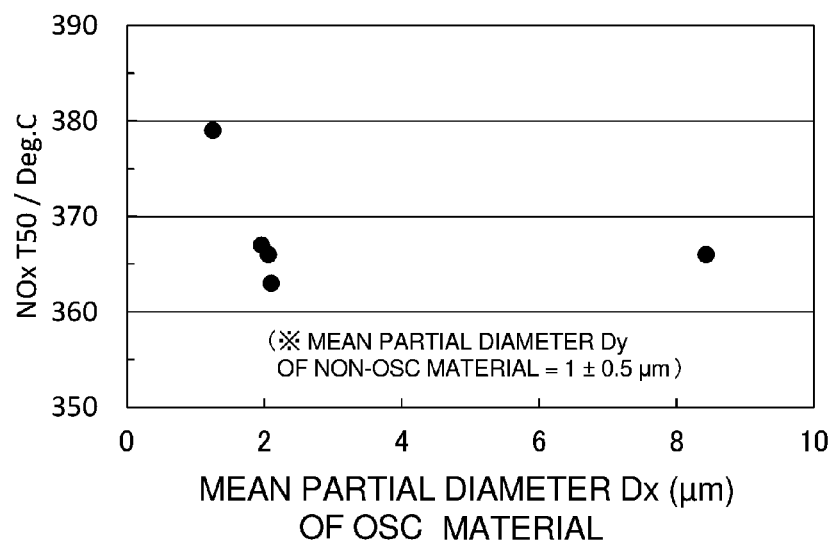
FIG. 7 is a graph showing a relationship between the mean particle diameter Dx of the OSC material and NOx-T50.

FIG. 7 is a graph showing a relationship between the mean particle diameter Dx of the OSC material and NOx-T50. FIG. 6 is a graph showing a relationship between the mean particle diameter Dy of non-OSC material and NOx-T50. As can be seen from FIG. 7, for example, when the mean particle diameter Dy of the non-OSC material is about 1 μm (e.g., 1±0.5 μm), the mean particle diameter Dx of the OSC material is preferably about 2 μm to about 10 μm. As can be seen from FIG. 6, for example, when the mean particle diameter Dx of the OSC material is about 2 μm (e.g., 2±0.5 μm), the mean particle diameter Dy of the non-OSC material is 3 μm or less, for example, preferably about 0.3 μm to about 2 μm.

Test Example 4: Examination of Catalyst Carrying Position of Lower Layer of Upper and Lower Two-Layer Structure Comparative Example 10

An exhaust gas purification catalyst of Comparative Example 10 was obtained in the same manner as in Example 3 except that the non-OSC material did not carry a catalyst metal when an inflow-side lower layer and an outflow-side lower layer were formed. The mean particle diameters Dx and Dy of the carrying materials were measured, and the NOx purifying performance was evaluated in the same manner as in Test Example 1. Table 4 shows the results.

TABLE 4

Examination of Location of Lower Layer where Catalyst is Carried

| Item | Raw material (Laser diffractometry) | | | Catalyst layer (Image analysis) | | | Location where catalyst metal is carried | NOx T50 (° C.) |
|---|---|---|---|---|---|---|---|---|
| | Db (μm) of non-OSC material | Da (μm) of OSC material | Da/Db | Dy (μm) of non-OSC material | Dx (μm) of OSC material | Dx/Dy | | |
| Example 3 | 0.5 | 9 | 18.0 | 1.24 | 8.43 | 6.80 | Both | 366 |
| Comparative Example 10 | 0.5 | 9 | 18.0 | 2.23 | 7.26 | 3.26 | Only OSC material | 380 |

As can be seen from Table 4, the NOx-T50 of the exhaust gas purification catalyst of Example 3 in which the non-OSC material and the OSC material carry the catalyst metals was remarkably lower than that of the exhaust gas purification catalyst of Comparative Example 10 in which only the OSC material carries the catalyst metal. In other words, the NOx purifying performance after the durability test was higher in Example 3 than in Comparative Example 10. One possible reason for this is as follows. When only the OSC material carries the catalyst metal, the position where the catalyst metal is present is limited. Thus, the OSC material is overcovered with the catalyst metal, making the catalyst metal more susceptible to degradation (e.g., sintering with the growth of the particles).

Test Example 5: Examination of Catalyst Carrying Position of Lower Layer of Upper and Lower Two-Layer Structure Example 10

An exhaust gas purification catalyst of Example 10 was obtained in the same manner as in Example 3 except that a non-OSC material having a mean particle diameter db of 0.5 μm and an OSC material having a mean particle diameter Da of 12 μm were used when an upper layer was formed. The mean particle diameters Dx and Dy of the carrying materials were measured, and the NOx purifying performance was evaluated in the same manner as in Test Example 1. Table 5 shows the results.

TABLE 5

Examination of Upper Layer

| | Raw material (Laser diffractometry) | | | Catalyst layer (Image analysis) | | | |
|---|---|---|---|---|---|---|---|
| Item | Db (μm) of non-OSC material | Da (μm) of OSC material | Da/Db | Dy (μm) of non-OSC material | Dx (μm) of OSC material | Dx/Dy | NOx T50 (° C.) |
| Example 10 | 0.5 | 12 | 24.0 | 0.80 | 1.69 | 2.11 | 361 |
| Example 3 | 0.5 | 9 | 18.0 | 1.24 | 8.43 | 6.80 | 366 |

In the exhaust gas purification catalyst of Example 10, the upper layer and the lower layer both satisfy 1.5 μm≤Dx and Dy<Dx. In the exhaust gas purification catalyst of Example 3, only the lower layer satisfies 1.5 μm≤Dx and Dy<Dx. As can be seen from Table 5, the NOx-T50 of the exhaust gas purification catalyst of Example 10 was lower than that of Example 3. In other words, the NOx purifying performance after the durability test was higher in Example 10 than in Example 3. The difference in the NOx-T50 between Example 3 and Example 10 was limited (small) compared to the differences between Examples 3 to 9 and Comparative Examples 3 to 9, for example. This result suggests that the lower layer satisfying Dy<Dx in the exhaust gas purification catalyst including a catalyst layer having a lamination structure of two or more layers exhibits the advantages of the technology disclosed herein better.

While some embodiments of the present invention have been described above, the embodiments are mere examples. The present invention can be executed in various other embodiments. The present invention can be executed based on the contents disclosed herein and the technical knowledge in the present field. The technology described is the appended claims include various modifications and changes of the foregoing embodiments. For example, it is possible to replace partially the embodiments with other aspects, and it is also possible to add other variations to the embodiments. If the technical feature is not described as essential, it can be eliminated, as appropriate.

REFERENCE SIGNS LIST

1 Exhaust Gas Purification System
10, 30 Exhaust Gas Purification Catalyst
11, 31 Base Material
20, 40 Catalyst Layer
21 Carrying Material
22 OSC Material
23 Non-OSC material (Carrier other than OSC Material)
40 Lower Layer
41a Inflow-side Lower Layer
41b Outflow-side Lower Layer
42 Upper Layer

The invention claimed is:

1. An exhaust gas purification catalyst comprising:
a base material and
a catalyst layer provided on the base material,
the catalyst layer including: a catalyst metal and a carrying material carrying the catalyst metal,
the carrying material including: an OSC material having an oxygen storage capacity and a carrier other than the OSC material,
the OSC material having a mean particle diameter Dx in volume base based on electron microscopy of 1.5 μm or more which is larger than a mean particle diameter Dy in volume base based on electron microscopy of the carrier other than the OSC material and
wherein the mean particle diameter Dy is 0.7 μm or more and 2 μm or less.

2. The exhaust gas purification catalyst according to claim 1, wherein a ratio (Dx/Dy) of the mean particle diameter Dx of the OSC material to the mean particle diameter Dy of the carrier other than the OSC material is 1.3 or more to 20 or less.

3. The exhaust gas purification catalyst according to claim 2, wherein a content ratio of the carrier other than the OSC material relative to 100 parts by mass of the OSC material is 25 parts by mass to 200 parts by mass.

4. The exhaust gas purification catalyst according to claim 3, wherein the OSC material has the mean particle diameter Dx of 15 μm or less.

5. The exhaust gas purification catalyst according to claim 3, wherein the OSC material is a Ce-containing oxide including ceria.

6. The exhaust gas purification catalyst according to claim 2, wherein the OSC material has the mean particle diameter Dx of 15 μm or less.

7. The exhaust gas purification catalyst according to claim 2, wherein the OSC material is a Ce-containing oxide including ceria.

8. The exhaust gas purification catalyst according to claim 2, wherein the carrier other than the OSC material is an Al-containing oxide including alumina.

9. The exhaust gas purification catalyst according to claim 2, wherein the catalyst layer is formed on a surface of the base material, and a second catalyst layer including a catalyst metal is formed on the catalyst layer, the catalyst metal being different in kind from the catalyst metal of the catalyst layer.

10. The exhaust gas purification catalyst according to claim 1, wherein a content ratio of the carrier other than the OSC material relative to 100 parts by mass of the OSC material is 25 parts by mass to 200 parts by mass.

11. The exhaust gas purification catalyst according to claim 1, wherein the OSC material has the mean particle diameter Dx of 15 μm or less.

12. The exhaust gas purification catalyst according to claim 1, wherein the OSC material is a Ce-containing oxide including ceria.

13. The exhaust gas purification catalyst according to claim 1, wherein the carrier other than the OSC material is an Al-containing oxide including alumina.

14. The exhaust gas purification catalyst according to claim 1, wherein the catalyst layer is formed on a surface of the base material and wherein a second catalyst layer including a catalyst metal is formed on the catalyst layer, the catalyst metal being different in kind from the catalyst metal of the catalyst layer.

15. The exhaust gas purification catalyst according to claim 14, wherein the catalyst layer includes Pd as the catalyst metal and wherein the second catalyst layer includes Rh as the catalyst metal.

16. The exhaust gas purification catalyst according to claim 1, wherein, in an exhaust gas flow direction from an inlet from which the exhaust gas flows in toward an outlet from which the exhaust gas flows out, the catalyst layer has different compositions on an upstream side and a downstream side.

17. The exhaust gas purification catalyst according to claim 16, wherein when the catalyst layer is divided in the exhaust gas flow direction into an early-stage portion near the inlet and a later-stage portion near the outlet, the early-stage portion includes a higher amount of the carrier other than the OSC material than the later-stage portion.

* * * * *